United States Patent
Gajic et al.

(10) Patent No.: US 12,342,259 B2
(45) Date of Patent: Jun. 24, 2025

(54) CORE NETWORK SUPPORT FOR TRANSPORT NETWORK PATH DIVERSITY FOR URLLC USER PLANE

(71) Applicant: Nokia Solutions and Networks Oy, Espoo (FI)

(72) Inventors: Borislava Gajic, Unterhaching (DE); Lajos Bajzik, Budapest (HU); Konstantinos Samdanis, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 464 days.

(21) Appl. No.: 17/772,838

(22) PCT Filed: Nov. 6, 2020

(86) PCT No.: PCT/EP2020/081302
§ 371 (c)(1),
(2) Date: Apr. 28, 2022

(87) PCT Pub. No.: WO2021/089788
PCT Pub. Date: May 14, 2021

(65) Prior Publication Data
US 2022/0394593 A1    Dec. 8, 2022

(30) Foreign Application Priority Data
Nov. 7, 2019   (EP) ..................................... 19207710

(51) Int. Cl.
*H04W 40/24*    (2009.01)
*H04L 45/24*    (2022.01)
(Continued)

(52) U.S. Cl.
CPC ........... *H04W 40/246* (2013.01); *H04L 45/24* (2013.01); *H04W 40/02* (2013.01); *H04W 40/32* (2013.01); *H04W 76/12* (2018.02); *H04W 76/15* (2018.02)

(58) Field of Classification Search
CPC ... H04W 40/246; H04W 40/32; H04W 76/12; H04W 40/02; H04W 76/15; H04L 45/24
See application file for complete search history.

(56) References Cited

U.S. PATENT DOCUMENTS

| 2017/0295088 | A1 | 10/2017 | van der Kluit et al. |
| 2019/0356601 | A1* | 11/2019 | Kweon ................. H04L 1/1628 |
| 2022/0345928 | A1* | 10/2022 | Park .................... H04L 61/5007 |

FOREIGN PATENT DOCUMENTS

| WO | 2017/071729 A1 | 5/2017 |
| WO | 2017/157457 A1 | 9/2017 |

OTHER PUBLICATIONS

"3rd Generation Partnership Project; Technical Specification Group Services and System Aspects; System Architecture for the 5G System; Stage 2 (Release 16)", 3GPP TS 23.501, V16.0.2, Apr. 2019, pp. 1-317.

(Continued)

*Primary Examiner* — Omer S Mian
(74) *Attorney, Agent, or Firm* — SQUIRE PATTON BOGGS (US) LLP (57) ABSTRACT

Information regarding disjoint transport paths of a transport network is acquired (S501). Based on the acquired information, a user plane node of a plurality of user plane nodes of a core network is selected (S503), from which at least one of the disjoint transport paths is reachable, wherein the user plane node is selected as an endpoint of at least one tunnel out of at least two tunnels to be established for a packet data unit, PDU, session to carry traffic between the user plane node and an access node of an access network, wherein the (Continued)

← → disjoint TN paths needed for the redundant N3/N9 tunnels belonging to the same PDU session at least two tunnels are to be set up by mapping the at least two tunnels to the disjoint transport paths.

13 Claims, 7 Drawing Sheets

(51) Int. Cl.
*H04W 40/02* (2009.01)
*H04W 40/32* (2009.01)
*H04W 76/12* (2018.01)
*H04W 76/15* (2018.01)

(56) References Cited

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.1.0, Mar. 2019, pp. 1-91.

Wu et al., "Yang Data Model for L3VPN Service Delivery", RFC 8299, Internet Engineering Task Force (IETF), Jan. 2018, pp. 1-188.
Wen et al., "A Yang Data Model for Layer 2 Virtual Private Network (L2VPN) Service Delivery", RFC 8466, Internet Engineering Task Force (IETF), Oct. 2018, pp. 1-158.
"3rd Generation Partnership Project; Technical Specification Group Services and System Aspects; Management and orchestration; 5G Network Resource Model (NRM); Stage 2 and stage 3 (Release 16)", 3GPP TS 28.541, V16.0.0, Mar. 2019, pp. 1-240.
"3rd Generation Partnership Project; Technical Specification Group Services and System Aspects; Telecommunication Management; Management and orchestration of networks and network slicing; 5G Core Network (5GC) Network Resource Model (NRM); Stage 2 and stage 3 (Release 15)", 3GPP TS 28.543, V1.0.0, Jun. 2018, pp. 1-42.
"3rd Generation Partnership Project; Technical Specification Group Core Network and Terminals; 5G System; Network Function Repository Services; Stage 3 (Release 15)", 3GPP TS 29.510, V15.3.0, Mar. 2019, pp. 1-121.
International Search Report and Written Opinion received for corresponding Patent Cooperation Treaty Application No. PCT/EP2020/081302, dated Dec. 15, 2020, 14 pages.
"UPF selection for 5G URLLC PDU Sessions", SA WG2 Meeting #135, S2-1909715, Nokia, Oct. 14-18, 2019, 4 pages.

* cited by examiner

CORE NETWORK SUPPORT FOR TRANSPORT NETWORK PATH DIVERSITY FOR URLLC USER PLANE

RELATED APPLICATION

This application claims priority to PCT Application No. PCT/EP2020/081302, filed on Nov. 6, 2020, which claims priority to EP Application Serial No. 19207710.5, filed on Nov. 7, 2019, each of which is incorporated herein by reference in its entirety.

TECHNICAL FIELD

At least some embodiments relate to an apparatus of a communications network system and a method for use by an apparatus of a communications network system, providing core network support for transport network path diversity for URLLC user plane.

BACKGROUND

In 4G networks, alignment and usage of transport network resources with mobile network connectivity are based on pre-configuration rules that map statically transport paths with mobile network bearers. The step towards 5G has brought new requirements, in terms of slicing and URLLC services that require a more dynamic way of mapping and using transport and mobile network resources.

Patent document [1] concentrates on SDN disjoint paths from Multi-Path TCP (MPTCP) perspective with the objective to dynamically manage disjoint paths without considering how to interact or enhance the mobile network layer neither aligning with the specific service of URLLC.

In patent document [2] the issue of discovering disjoint paths is addressed considering the transport protocol perspective but alignment with the mobile layer is not considered.

The protocol insights related to establishing disjoint paths are also elaborated in patent document [3] again not touching the mobile network alignment issue.

With regards of establishing a linkage between the underlying transport layer and the mobile network, initial efforts concentrated on the configuration phase with numerous contributions that introduced data models for exposing the capabilities of different transport technologies such as RFC 8299, RFC 8466 and ONF Open Transport API (TAPI) to the 3GPP management system. However, none of these proposals concentrated on using transport paths in alignment with the configuration of PDU sessions especially for the case of URLLC where disjoint paths are needed.

CITATION LIST

[1] WO 2017/057457 A1
[2] US 2017/295088 A1
[3] WO 2017/071729 A1

LIST OF ABBREVIATIONS

3GPP Third Generation Partnership Project
5G Fifth Generation
5GC 5G Core
AMF Access and Mobility Management Function
AF Application Function
API Application Programming Interface
DN Data Network
DNN DN Name
gNB 5G NodeB
I Intermediate
ID Identifier
IOC Information Object Class
IP Internet Protocol
MPTCP Multi-Path TCP
NEF Network Exposure Function
NF Network Function
NG Next Generation
NRF Network Repository Function
NRM Network Resource Model
NSI Network Slice Instance
OAM Operations Administration and Management
ONF Open Networking Foundation
PDU Packet Data Unit
PLMN Public Land Mobile Network
RAN Radio Access Network
SBA Service-Based Architecture
SDN Software-Defined Networking
SM Session Management
SMF SM Function
S-NSSAI Network Slice Selection Assistance Information
TAPI ONF Transport API
TCIF Transport Connection Information Function
TCP Transmission Control Protocol
TN Transport Network
TSN Time-Sensitive Networking
UDR Unified Data Repository
UE User Equipment
UP User Plane
UPF UP Function
URLLC Ultra Reliable Low Latency Communication

SUMMARY

At least some embodiments aim at aligning mobile layer connectivity, i.e. establishment of PDU sessions, with an underlying transport network layer, for supporting URLLC with disjoint paths.

According to at least some embodiments, this is achieved by an apparatus, a method, and a non-transitory computer-readable storage medium as specified by the appended claims.

In the following, example embodiments and example implementations will be described with reference to the accompanying drawings.

It is noted that the scope of protection sought for various embodiments and implementations is set out by the independent claims. Examples and features, if any, described in this specification that do not fall under the scope of the independent claims are to be interpreted as examples useful for understanding various embodiments and implementations.

DESCRIPTION OF THE EMBODIMENTS

First, aspects regarding reliability of an interface (e.g. N3 interface) between an access node (e.g. gNB) of an access network (e.g. RAN) and a user plane node (e.g. UPF) and an interface (e.g. N9) between user plane nodes (e.g. UPFs) of a core network will be described.

Figure 1:
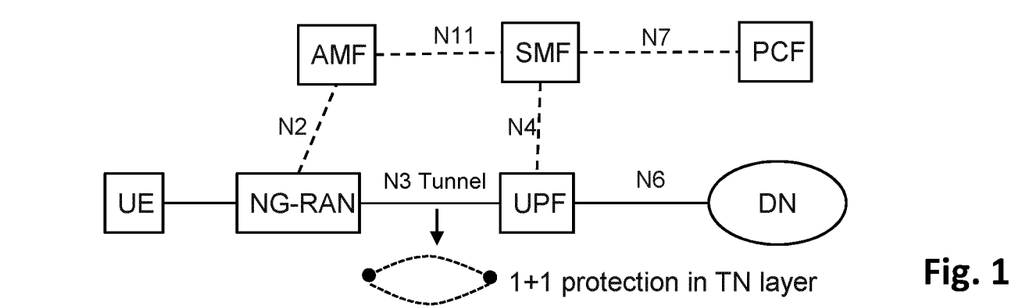
FIG. 1 shows a schematic diagram illustrating relations between entities of a communications network system for explaining protection at transport layer.

An approach for increasing the reliability of the N3 interface between a gNB and a UPF is described in 3GPP TR 23.501, sub-clause 5.33.2.3, "Support for redundant transmission at transport layer". In this respect, FIG. 1 illustrated entities of a communications network or communications network system and relations thereof. A UE accesses the communications network via an NG-RAN that provides connection to a core network comprising entities AMF, SMF, PCF and UPF. The NG-RAN and the AMF are connected by an N2 interface, the AMF and the SMF are connected via an N11 interface, the SMF and the UPF are connected via an N4 interface, and the SMF and the PCF are connected via an N7 interface. The UPF provides connection to a DN via an N6 interface.

As illustrated in FIG. 1, the NG-RAN (e.g. gNB) is connected to the UPF via the N3 interface. For increasing the reliability of the N3 interface, a single N3 tunnel is used, but is mapped to a transport connection which is protected by 1+1 protection in the transport layer. 1+1 protection means that the transport layer duplicates the traffic, sends it over two disjoint paths and re-combines it at the other end as illustrated in FIG. 1.

The "Study on Enhancement of URLLC support in the 5G Core network", 3GPP TR 23.725, in Release 16 introduces the requirement for supporting high reliability by redundant transmission in the user plane. Different solutions are recommended for normative phase being included in 3GPP TS 23.501, clause 5.33.2. The following mechanisms are considered, which are illustrated in FIGS. 2 to 4.

Figure 2:
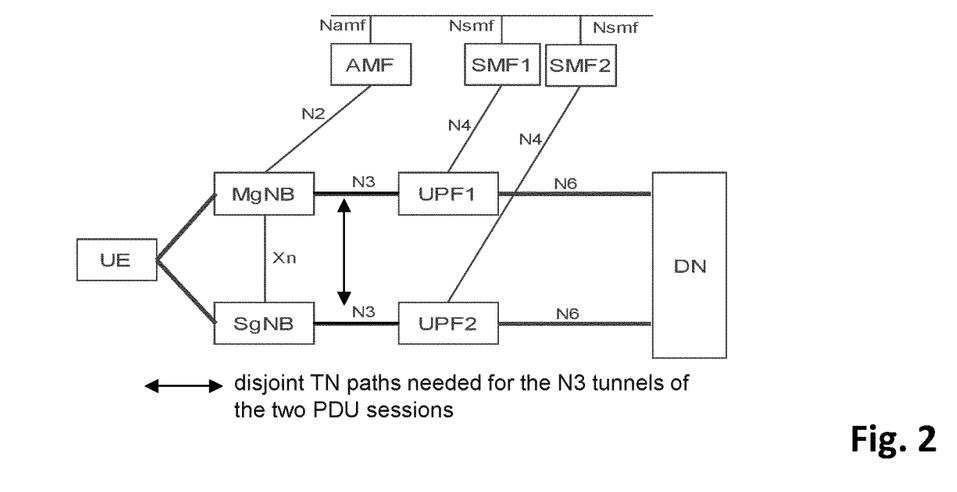
FIG. 2 shows a schematic diagram illustrating relations between the entities of the communications network system for explaining dual connectivity based end to end redundant user plane paths.

As shown in FIG. 2, according to a first mechanism, a UE is connected to two gNBs (i.e. MgNB and SgNB, which are connected via an Xn interface) and has two PDU sessions which are using a different set of UPFs (i.e. UPF1 and UPF2) and different gNBs. Namely, one PDU session is established via the MgNB and the other via the SgNB. Hence, traffic is duplicated over both PDU sessions and re-combined at the UE and DN respectively.

Figure 3:
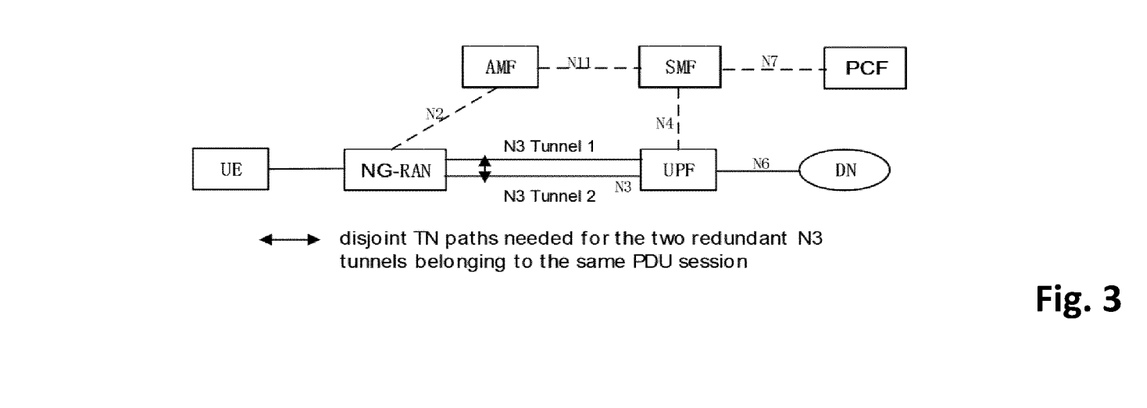
FIGS. 3 and 4 show schematic diagrams illustrating relations between the entities of the communications network system for explaining support of redundant transmissions on N3/N9 interfaces.
Figure 4:
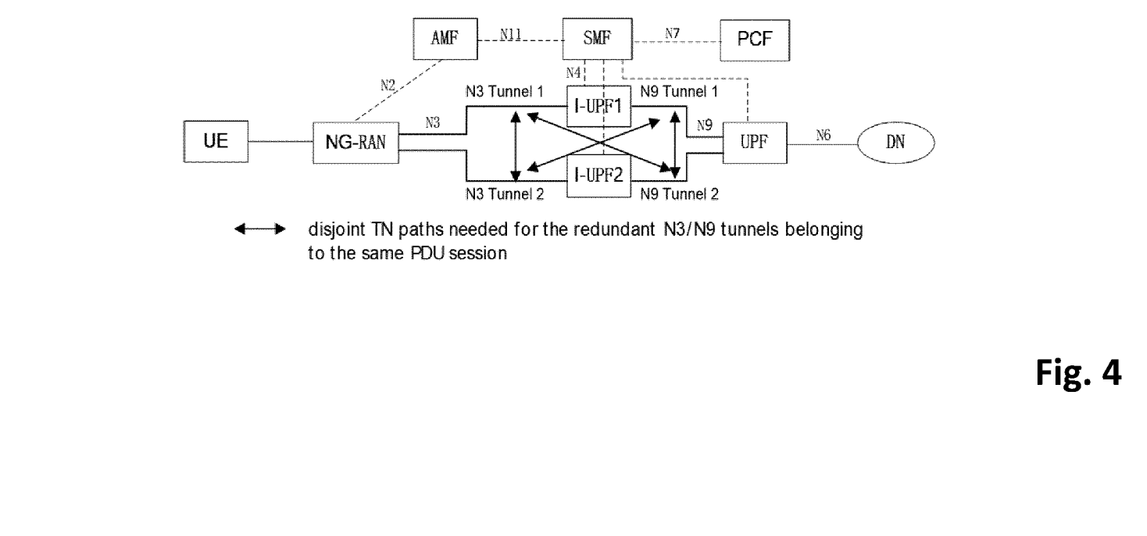

A second mechanism is shown in FIGS. 3 and 4. A UE is connected using two N3 tunnels among a single pair of gNB (indicated as NG-RAN) and UPF. Although the same network nodes are used redundancy is achieved by using different tunnels. Two variants of the approach are considered, one with no intermediate UPFs (i.e. no I-UPFs) as shown in FIG. 3, and another in which different intermediate I-UPFs exists as shown in FIG. 4.

During SM (Session Management) procedures, N3 and N9 GTP-U tunnels are established per-PDU session to carry the traffic of the session between UPF and gNB nodes. When setting up the N3/N9 tunnel, the tunnel is mapped to a specific transport path. During N3/N9 tunnel establishment it is either the responsibility of the SMF or the PSA UPF to determine the Transport Network (TN) tunnel information.

To achieve the desired reliability, the related N3 and N9 tunnels used for the PDU session(s) must be mapped to disjoint transport layer paths in order to assure redundancy in the transport layer too. If entirely disjoint paths are not possible, then paths that share the least number of common point of failures (transport links and nodes) must be used, which are referred to as maximally disjoint paths.

To allow disjoint paths in both mobile and transport layers during the UPF selection for configuring a PDU session with URLLC requirements there is a need to either:
  (i) consult the transport layer regarding the nature of paths to assure that they are disjoint, or
  (ii) allow the core network, e.g. AMF/SMF, to have transport layer information regarding disjoint transport layer path capabilities related with the selection of UPFs for establishing N3/N9 tunnels.

According to at least some embodiments, necessary TN capabilities related to disjoint transport paths are exposed, i.e. made visible, to relevant 5G NFs.

Figure 5:
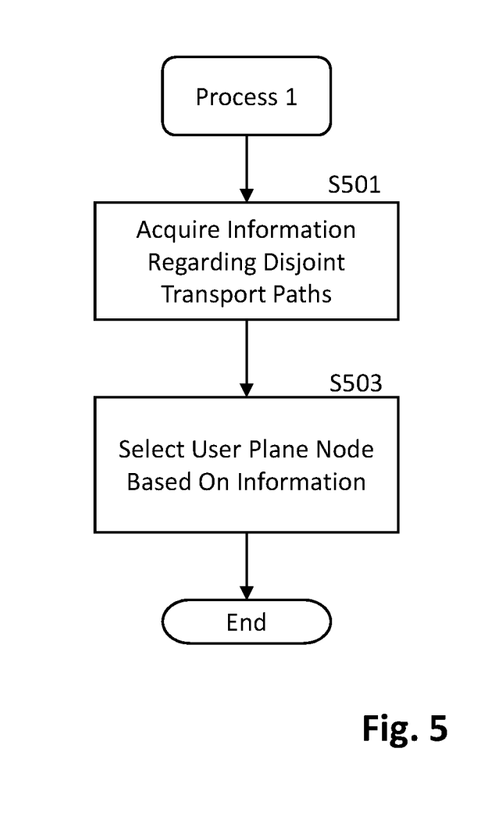
FIG. 5 shows a flowchart illustrating a process 1 according to at least some embodiments.

FIG. 5 illustrates a process 1 for aligning the mobile layer connectivity, i.e. the establishment of PDU sessions, with the underlying transport network layer, for supporting URLLC with disjoint paths, according to at least some embodiments.

In step S501, information (e.g. transport network information) regarding disjoint transport paths of a transport network is acquired. Then, the process proceeds to step S503.

In step S503, based on the acquired information, a user plane node (e.g. a UPF) of a plurality of user plane nodes of a core network, from which at least one of the disjoint transport paths is reachable, is selected as an endpoint of at least one tunnel out of at least two tunnels to be established for a PDU session to carry traffic between the user plane node and an access node (e.g. a gNB) of an access network (e.g. NG-RAN), wherein the at least two tunnels are to be set up by mapping the at least two tunnels to the disjoint transport paths.

According to at least some embodiments, the disjoint transport paths comprise at least two paths that share the least number of common transport links and nodes in the transport network.

According to at least some embodiments, step S501 is performed in case it is determined that the user plane node to be selected for the PDU session that requires a highly reliable communication service, such as URLLC or other type of special service/slice, e.g. for support of TSN traffic having high reliability requirements.

It is noted that a user plane node from which at least one of the disjoint transport paths is reachable is a user plane node that can be connected via the disjoint transport paths.

First and Second Options

In the following, first and second options relating to consulting the transport layer regarding the nature of paths to assure that they are disjoint will be described.

According to example embodiments directed to the first option, a new network function type, TCIF (Transport Connection Information Function) is introduced into 5G SBA, via Ntcif service interface. Core network functions, e.g. AMF/SMF, as clients can get an insight of the TN layer, and hence can check easily path attributes with respect to disjoint capabilities.

According to example embodiments directed to the second option, similarly to the first option, a TCIF via the form of e.g. SDN controller, can act as an AF and can interact with the SBA providing an insight of the TN layer regarding disjoint paths. Such an approach can take advantage of an NEF function if the AF belongs to a third party, where the conventional NEF mechanisms require some extensions to handle the subscription of TN capabilities.

Detailed Description of First Option

According to example embodiments, a new network function type, TCIF (Transport Connection Information Function) is introduced into 5G SBA, providing Ntcif service interface. Via this interface, session management nodes of the core network (e.g. SMFs) as clients can get an abstracted view of TN connections that are configured between UP NFs and available to be selected for N3/N9 tunnels. The abstracted TN connectivity information comprises a TN connection graph and a list of pairs of edges in this graph. The graph nodes represent user plane NFs, each node belonging to an UPF or a gNB. The edges represent transport connections between the end nodes, where there can be multiple edges between the same nodes. The abstracted information contains the following information for each transport connection:

The routing information (IP address, Network Instance) that selects the transport connection when included in the N3/N9 tunnel information.
  Whether the transport connection is protected by TN layer redundancy mechanism, e.g. 1+1 protection.

A list of transport connection pairs represents the information which pairs of transport connections are provisioned by OAM so that their transport path is disjoint from each other. The two connections in a pair can have the same end nodes, or one or both end nodes can be different.

Referring to FIG. 5, according to example embodiments of the first option, in S501, the information is acquired using an interface between the core network and the transport network.

According to an example implementation, the information comprises transport network connectivity information comprising a connection graph of the transport network and a list of pairs of edges in the connection graph, wherein nodes in the connection graph belongs to user plane nodes or access nodes, and the edges represent transport connections between endpoints, and, optionally, there is a plurality of edges between same endpoints.

According to an example implementation, the transport network connectivity information comprises routing information which selects a transport connection when included in information on a tunnel to be established for the PDU session between the user plane node and the access node, and an indication as to whether the transport connection is protected by a redundancy mechanism.

According to an example implementation, in case of the redundancy mechanism, a list of transport connection pairs is acquired, which represents information that which pairs of transport connections are provisioned so that their transport paths are disjoint from each other.

An example implementation of the interface between the core network and the transport network is that the transport SDN controller implements the Nticf service interface and registers in the SBA as a provider for this interface (i.e. as NF of type TCIF).

In other words, the interface between the transport network and the core network is implemented by a TCIF. For example, the TCIF is implemented using SDN in SBA, and the information regarding disjoint transport paths of the transport network is acquired by the NF interacting with the TCIF.

Figure 6:
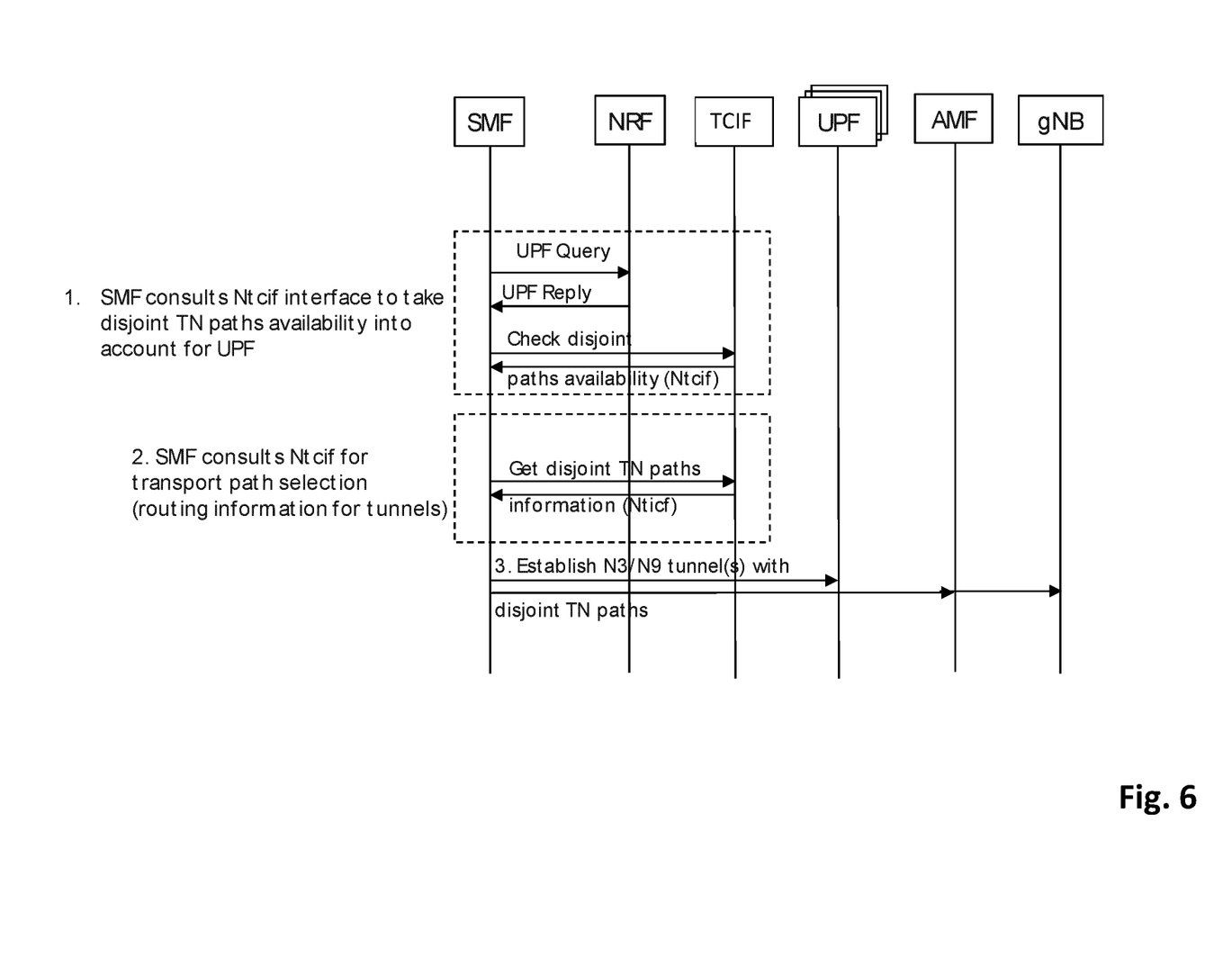
FIG. 6 shows a signaling diagram illustrating session management procedures leveraging on an interface between a core network and a transport network according to example embodiments directed to a first option.

FIG. 6 shows how the SMF uses this service interface during SM procedures. FIG. 6 shows a signaling diagram illustrating signaling between entities session management node (e.g. SMF), NRF, TCIF (e.g. SDN), UPF, AMF and access node (e.g. gNB) according to example embodiments.

In a procedure 1 in FIG. 6, the SMF consults Nticf interface to take disjoint TN paths availability into account for UPF. The procedure 1 comprises a UPF query by the SMF to the NRF, in response to which the NRF replies with information on a user plane node (e.g. UPF) in a UPF reply.

Further, in procedure 1 in FIG. 6, the SMF checks disjoint paths availability for the queried UPF by communicating with the TCIF.

In a procedure 2 in FIG. 6, the SMF consults Nticf for transport path selection, e.g. routing information for tunnels. As shown in FIG. 6, in procedure 2 the SMF gets disjoint TN paths information from the TCIF.

In a procedure 3 in FIG. 6, the SMF establishes N3/N9 tunnel(s) with the disjoint TN paths obtained in procedure 2.

Detailed Description of Second Option

According to example embodiments, the above-described TCIF is introduced in the SBA as an AF, taking advantage of the current interfaces, i.e. Nnef SBA interface. In this context, an AF, e.g. an SDN controller, is able to provide TN insights to the mobile core network enabling an easier way to check and align the URLLC reliability requirement of disjoint paths. Certain extensions in the NEF are required if the AF is untrusted to handle the TN subscription for e.g. the SDN controller.

Figure 7:
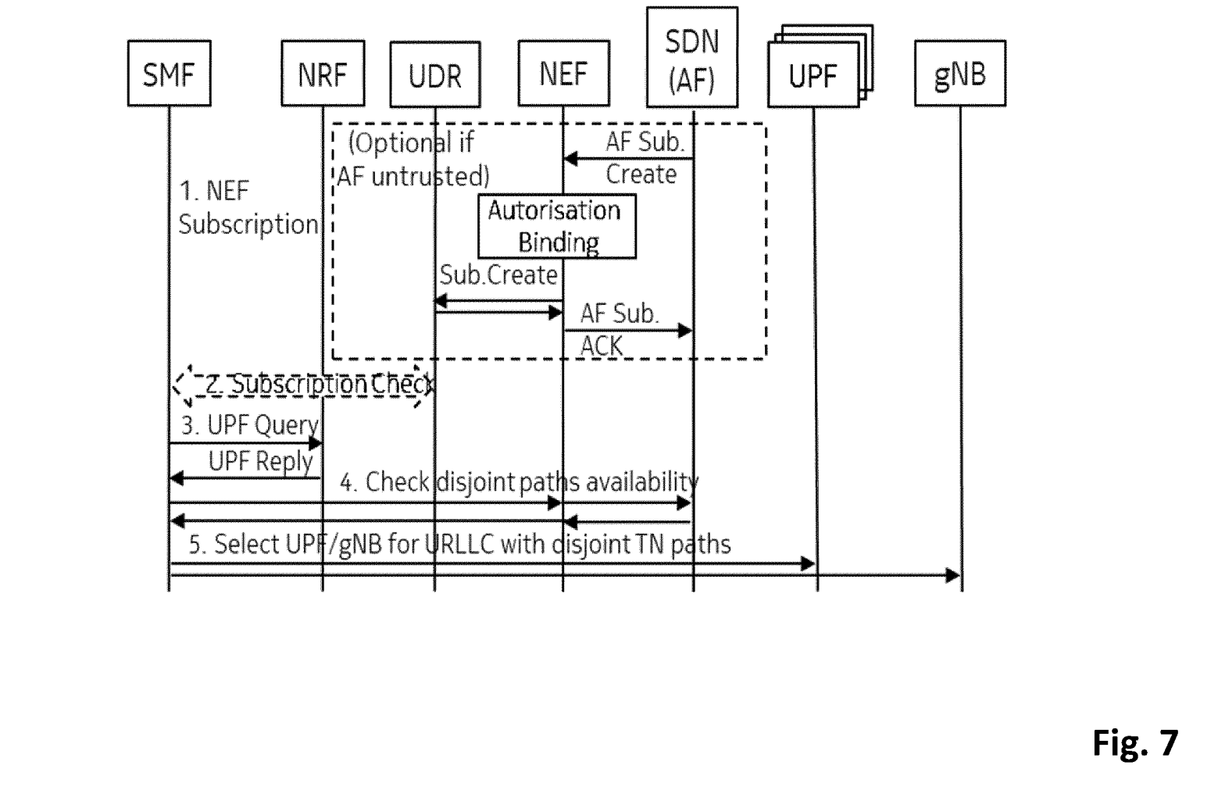
FIG. 7 shows a signaling diagram illustrating a transport connection information service provided by an AF according to example embodiments directed to a second option.

FIG. 7 shows a signaling diagram illustrating signaling between entities session management node (e.g. SMF), NRF, UDR, NEF, SDN (AF), UPF and access node (e.g. gNB) according to example embodiments.

The SDN controller as AF introduces a path disjoint check service or can alternatively register service in UDR in relation with UE subscription. Once the AF (SDN controller) subscribes to NEF (step 1 in FIG. 7) it creates a binding that allows other NFs to acquire its services. The core network, e.g. a session management node (e.g. AMF/SMF), that needs to select UPF for an URLLC service checks the UE subscription (step 2 in FIG. 7) and checks the NRF (step 3 in FIG. 7). Then the AMF/SMF acquires the AF (SDN) information regarding disjoint paths via the means of NEF (step 4 in FIG. 7). Once TN information is provided, the AMF/SMF can select the UPF and establish the PDU session (step 5 in FIG. 7).

In the second option, according to an example implementation, the interface between the core network and the transport network is implemented by an application function, which is accessed based on subscription information of a user equipment involved in the PDU session.

Third Option

In the following, a third option directed to allowing the core network, e.g. AMF/SMF, to have transport layer information regarding disjoint transport layer path capabilities related with the selection of UPFs for establishing N3/N9 tunnels will be described.

According to example embodiments directed to the third option, extensions of UPF profile and UPF NRM are introduced. The extensions in the UPF profile capture the information regarding the disjoint paths of the TN. Such disjoint paths may represent the path from particular UPF instance towards particular gNBs and DNs (Data Networks). The extensions of the UPF NRM (Network Resource Model) are needed for proper configuration of the UPF by the network management system. Using such UPF NRM extensions the OAM (Operations Administration and Management) system can include the information on disjoint transport network paths, as received from transport network management system, into the configuration of UPF. The extended UPF profile with the information on the disjoint paths will be registered to the NRF (Network Repository Function). Such extensions will facilitate core network, e.g. AMF/SMF, discovery of the most suitable UPF instance for a given PDU session considering disjoint transport network paths.

Detailed Description of Third Option

As described in 3GPP TS 23.501, NRF (Network Repository Function) maintains the profile of available NFs (Network Functions) and their services. Furthermore, the NRF enables the discovery of such NFs and their services. The NF profile includes the information such as: NF instance ID, NF type, PLMN ID, Network Slice related identifiers (S-NSSAI—Network Slice Selection Assistance Info, NSI—Network Slice Instance ID), etc. In addition to such common information, the UPF profile also contains the information on the SMF area identities. On top of such available information, according to example embodiments directed to the third option, in the UPF profile extensions are introduced to capture the information on disjoint paths towards gNBs and DNs that can be reached from a particular UPF.

Figure 8:
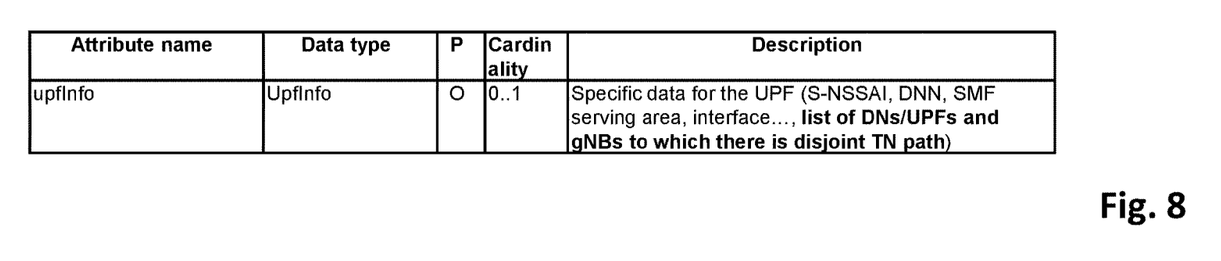
FIG. 8 shows a table reflecting information related to a UPF according to example embodiments directed to a third option.

According to an example implementation, a list of DNs/UPFs and gNBs that can be reached via disjoint paths is introduced in the UPF profile. FIG. 8 shows a part of a table representing the structure (i.e. Attribute name, Data type, P, Cardinality and Description) to be used in resource representations, which reflects the information related to UPF. In FIG. 8, the extensions in UPF profile according to the example implementation are highlighted using boldface.

Furthermore, according to example embodiments directed to the third option, the corresponding extension of UPF NRM is introduced.

According to an example implementation, the existing Information Object Class EP_N3 is extended. This IOC represents the N3 interface between (R)AN and UPF and is extended with an indication on "disjoint path address" in "Attribute name" to be used in order to offer a disjoint connectivity. This parameter specifies the address including IP address and/or VLAN ID used for utilizing the underlying transport network via disjoint paths.

Figure 9:
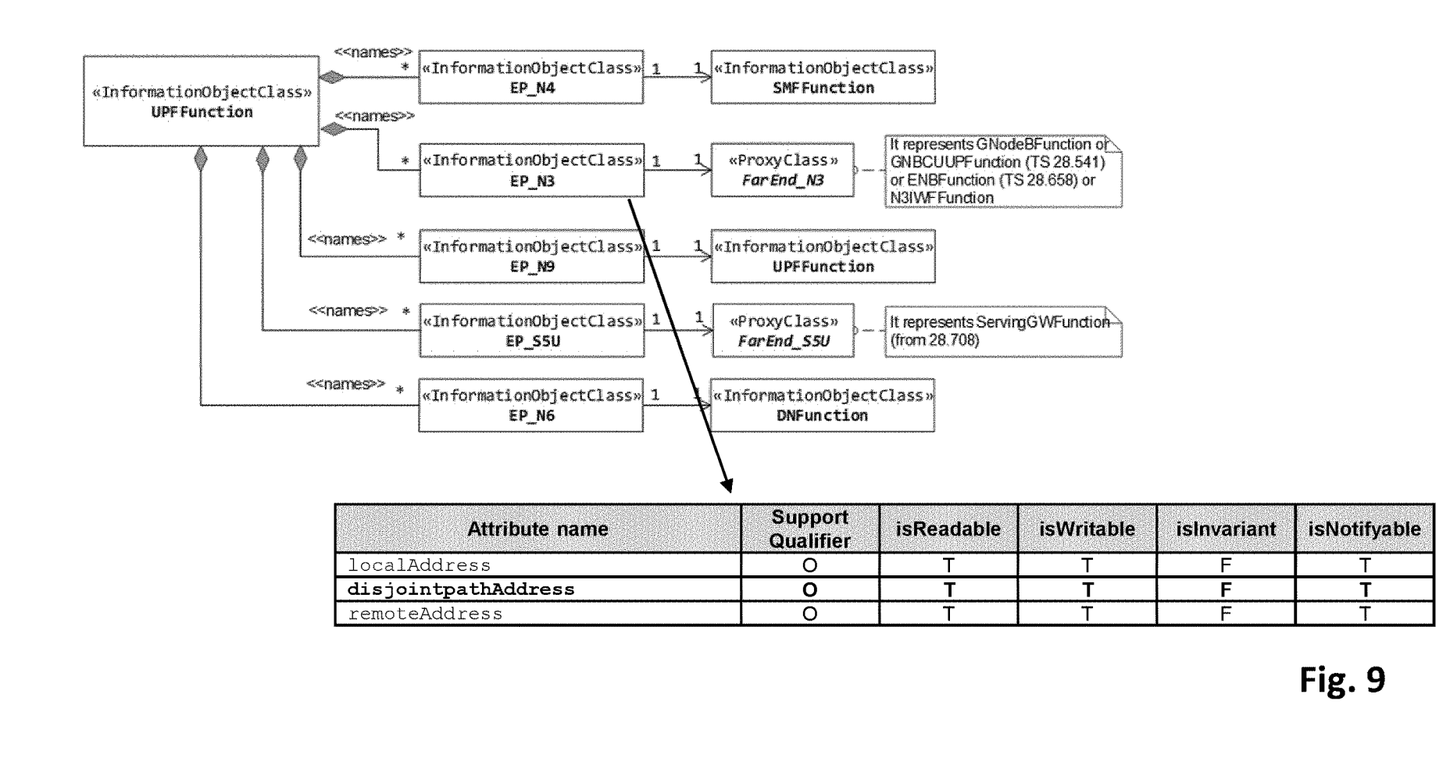
FIG. 9 shows a diagram illustrating a transport view of UPF NRM according to example embodiments directed to the third option.

FIG. 9 shows the UPF NRM extension according to the example implementation highlighted using boldface. The structure of the IOC EP_N3 shown in FIG. 9 further comprises "Support Qualifier", "is Readable", "is Writable", "is Invariant" and "is Notifiable", which are indicated for the "disjoint path address" as "O", "T", "T", "F" and "T", respectively, where "O" means "optional", "T" means "true", and "F" means "false".

Similarly to N3 interface, according to example embodiments directed to the third option, the extensions are applied to N9 interface as well.

Referring to FIG. 5, according to example embodiments of the third option, in S501, the information is acquired from a profile of the user plane node.

According to an example implementation, the profile comprises a list of data networks and/or user plane nodes of the core network and access nodes of the access network to which there is a disjoint path of the transport network, that is reachable from the user plane node.

According to example embodiments of the third option, in step S501 in FIG. 5, the information further is acquired from a model of the user plane node, the model including an indication on an address to be used for initializing transport via disjoint paths, wherein the indication is associated with an interface between the user plane node and the access network and/or with an interface between the user plane node and another user plane node of the plurality of user plane nodes.

Figure 10:
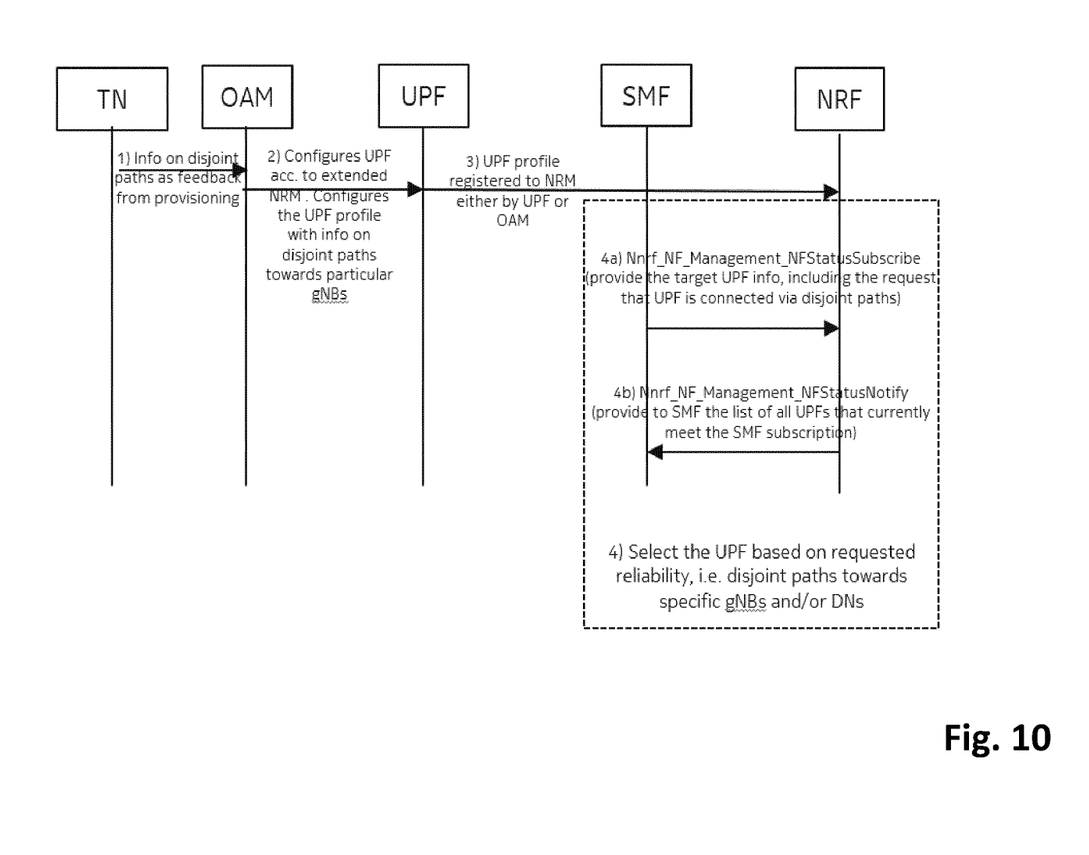
FIG. 10 shows a signaling diagram illustrating a message sequence for UPF selection by SMF according to example embodiments directed to the third option.

FIG. 10 shows procedures leveraging the extension proposed in this third option such that the session management node (e.g. SMF) can select the appropriate user plane node (e.g. UPF) which can fulfill the reliability requirements. In the signaling diagram of FIG. 10, communication is performed between entities TN, OAM, UPF, SMF and NRF.

In step 1 in FIG. 10, the transport network management system (e.g. TN) provides the information on disjoint transport paths towards the OAM. This information may be available in abstracted form, e.g. containing the information on nodes (gNBs and UPFs), information on a disjoint path connectivity, etc.

In step 2 in FIG. 10, based on the information from TN management system the OAM may configure the UPF according to extended NRM as well as UPF profile.

In step 3 in FIG. 10, in order for the NF such as UPF and its service to be discovered via the NRF, the UPF instance needs to be registered in the NRF. During the registration the NRF receives the information on UPF profile. This can be done either by UPF or OAM (in the case where OAM directly provides this information the step 2 from above is optional). Such registration is performed e.g. when the UPF instance and its service(s) become operative. In the case of a change in NF profile, this needs to be updated at NRF. The interested NFs may subscribe to NRF in order to receive such NF updates.

In step 4 in FIG. 10, the selection of the UPF is performed by the SMF. According to example embodiments directed to the third option, the selection of the UPF leverages on information from UPF profile on UPF capabilities, e.g. UPF supporting the disjoint transport network connectivity towards gNBs or DNs/UPFs.

According to example embodiments, the UPF selection involves a step 4a in FIG. 10, which is a step of SMF discovering available UPF(s). In this procedure, according to example embodiments, the SMF utilizes the NRF to discover UPF instance(s). According to an example implementation, the SMF issues a request to the NRF that includes at least one of the following: DNN (Data Network Name), S-NSSAI, SMF Area Identity.

Additionally, according to example embodiments, in step 4a in FIG. 10, the SMF requests discovery of only the UPF instances that can be connected via disjoint transport network paths, e.g. if the S-NSSAI indicates that it is URLLC slice.

In step 4b in FIG. 10, SMF receives an answer from the NRF, providing to the SMF the NF profile(s) of UPF instance(s) matching the SMF's request including the requirement on support for disjoint paths.

Alternatively, according to example embodiments, in step 4a in FIG. 10, the SMF requests profiles of all UPF instances for a specific DNN and SMF Area Identity. Then, the SMF selects the UPF instance that in the profile indicates to be able to support disjoint paths.

As illustrated in FIG. 10, according to example embodiments directed to the third option, a session management node (e.g. SMF) of the core network issues (step 4a) a request to a network repository function (e.g. NRF) of the core network, to which the transport network information has been registered in advance (in steps 1-3), wherein the request includes at least one of a name of a data network involved in the PDU session, network slice selection assistance information regarding the PDU session, an area identity of the session management node and a requirement that the user plane node can be connected via the disjoint transport paths.

Figure 11:
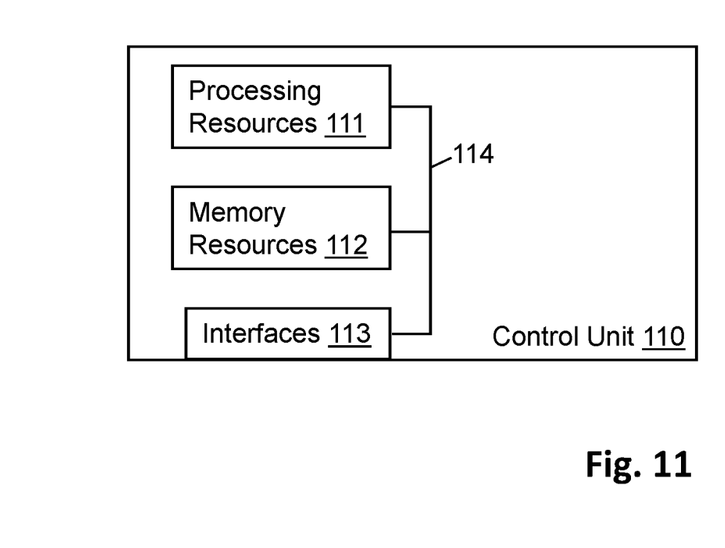
FIG. 11 shows a schematic block diagram illustrating a configuration of a control unit in which at least some embodiments are implementable.

Now reference is made to FIG. 11 for illustrating a simplified block diagram of a control unit 110 that is suitable for use in practicing at least some embodiments and implementations.

The control unit 110 comprises processing resources (e.g. processing circuitry) 111, memory resources (e.g. memory circuitry) 112 and interfaces (e.g. interface circuitry) 113, which are linked via a connection 114. The memory resources 112 are configured to store a program that when executed by the processing resources 111 cause the control unit 110 to operate in accordance with at least some of the embodiments and implementations, as detailed above. In general, at least some of the above described embodiments and implementations are implemented by computer software stored in the memory resources 112, or by hardware, or by a combination of software and/or firmware and hardware.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to an aspect, an apparatus is provided. According to an example implementation, the apparatus executes the process shown in FIG. 5. Alternatively or in addition, the apparatus comprises the control unit 110.

The apparatus comprises means for acquiring information regarding disjoint transport paths of a transport network, and means for selecting, based on the acquired information, a user plane node of a plurality of user plane nodes of a core network, from which at least one of the disjoint transport paths is reachable, wherein the user plane node is selected as an endpoint of at least one tunnel out of at least two tunnels to be established for a packet data unit, PDU, session to carry traffic between the user plane node and an access node of an access network, wherein the at least two tunnels are to be set up by mapping the at least two tunnels to the disjoint transport paths.

According to an example implementation, the disjoint transport paths comprise at least two paths that share the least number of common transport links and nodes in the transport network.

According to an example implementation, the acquiring is performed in case it is determined that the user plane node to be selected for the PDU session that requires a highly reliable communication service.

According to an example implementation, the predetermined information is acquired from a profile of the user plane node.

According to an example implementation, the profile contains among other information a list of data networks and/or user plane nodes of the core network and access nodes of the access network to which there is a disjoint path of the transport network, that is reachable from the user plane node.

According to an example implementation, the information is acquired from a model of the user plane node, the model including an indication on an address to be used for initializing transport via disjoint paths, wherein the indication is associated with an interface between the user plane node and the access network and/or with an interface between the user plane node and another user plane node of the plurality of user plane nodes.

According to an example implementation, the means for acquiring comprises means for issuing a request from a session management node of the core network to a network repository function of the core network, to which the information has been registered in advance, wherein the request includes at least one of a name of a data network involved in the PDU session, network slice selection assistance information regarding the PDU session, an area identity of the session management node and a requirement that the user plane node can be connected via the disjoint transport paths.

According to an example implementation, the means for acquiring performs the acquiring in case it is determined from the network slice selection assistance information that the user plane node to be selected for the PDU session is required to support a highly reliable communication service.

According to an example implementation, the information comprises transport network connectivity information comprising a connection graph of the transport network and a list of pairs of edges in the connection graph, wherein nodes in the connection graph belongs to user plane nodes or access nodes, and the edges represent transport connections between endpoints, and, optionally, there is a plurality of edges between same endpoints, wherein the transport network connectivity information further comprises a list of transport connection pairs that indicates which pairs of transport connections are provisioned so that their transport path is disjoint from each other, wherein the two transport connections in a pair can have the same end nodes, or one or both end nodes can be different.

According to an example implementation, the transport network connectivity information comprises routing information which selects a transport connection when included in information on a tunnel to be established for the PDU session between the user plane node and the access node, and an indication as to whether the transport connection is protected by a redundancy mechanism.

According to an example implementation, the transport connectivity information is acquired using an interface between the core network and the transport network.

According to an example implementation, an interface between the transport network and the core network is implemented by a transport connection information function.

According to an example implementation, the transport connection information function is implemented using software-defined networking in service-based architecture.

According to an example implementation, the information regarding disjoint transport paths of the transport network is acquired by a network function interacting with the transport connection information function.

According to an example implementation, an interface between the transport network and the core network is implemented by an application function, and the apparatus further comprises means for accessing the application function based on subscription information of a user equipment involved in the PDU session.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising at least one processor and at least one memory including computer program code, the at least one memory and the computer program code configured to, with the at least one processor, cause the apparatus at least to perform:
in response to determining that a user plan node to be selected for a packet data unit, PDU, session requires a highly reliable communication service, acquiring information regarding disjoint transport paths of a transport network, wherein the information is acquired from a profile of the user plane node, and the information comprises transport network connectivity information comprising a connection graph of the transport network and a list of pairs of edges in the connection graph, wherein nodes in the connection graph belongs to user plane nodes or access nodes, and the edges represent transport connections between endpoints, and there is a plurality of edges between same endpoints; and
selecting, based on the acquired information, the user plane node of a plurality of user plane nodes of a core network, from which at least one of the disjoint transport paths is reachable, wherein the user plane node is selected as an endpoint of at least one tunnel out of at least two tunnels to be established for the PDU session to carry traffic between the user plane node and an access node of an access network, wherein the at least two tunnels are to be set up by mapping the at least two tunnels to the disjoint transport paths.

2. The apparatus of claim 1, wherein the disjoint transport paths comprise at least two paths that share the least number of common transport links and nodes in the transport network.

3. The apparatus of claim 1, wherein the profile contains among other information a list of data networks and/or user plane nodes of the core network and access nodes of the access network to which there is a disjoint path of the transport network, that is reachable from the user plane node.

4. The apparatus of claim 3, wherein additional information is acquired from a model of the user plane node, the model including an indication on an address to be used for initializing transport via disjoint paths, wherein the indication is associated with an interface between the user plane node and the access network and/or with an interface between the user plane node and another user plane node of the plurality of user plane nodes.

5. The apparatus of claim 1, the acquiring comprising: issuing a request from a session management node of the core network to a network repository function of the core network, to which the information has been registered in advance, wherein the request includes at least one of a name of a data network involved in the PDU session, network slice selection assistance information regarding the PDU session, an area identity of the session management node and a requirement that the user plane node can be connected via the disjoint transport paths.

6. The apparatus of claim 5, wherein the acquiring is performed in case it is determined from the network slice selection assistance information that the user plane node to be selected for the PDU session is required to support a highly reliable communication service.

7. The apparatus of claim 1, wherein the transport network connectivity information further comprises a list of transport connection pairs that indicates which pairs of transport connections are provisioned so that their transport path is disjoint from each other, wherein the two transport connections in a pair can have the same end nodes, or one or both end nodes can be different.

8. The apparatus of claim 7, wherein the transport network connectivity information comprises routing information which selects a transport connection when included in information on a tunnel to be established for the PDU session between the user plane node and the access node, and an indication as to whether the transport connection is protected by a redundancy mechanism.

9. The apparatus of claim 7, wherein the transport connectivity information is acquired using an interface between the core network and the transport network.

10. The apparatus of claim 7, wherein an interface between the transport network and the core network is implemented by a transport connection information function.

11. The apparatus of claim 10, wherein the transport connection information function is implemented using software-defined networking in service-based architecture.

12. The apparatus of claim 10, wherein the information regarding disjoint transport paths of the transport network is acquired by a network function interacting with the transport connection information function.

13. The apparatus of claim 7, wherein an interface between the transport network and the core network is implemented by an application function, and wherein the at least one memory and the computer program code are configured to, with the at least one processor, cause the apparatus to further perform: accessing the application function based on subscription information of a user equipment involved in the PDU session.

\* \* \* \* \*